United States Patent [19]
Morrow

[11] Patent Number: 5,992,808
[45] Date of Patent: Nov. 30, 1999

[54] ASSEMBLY FOR RETAINING ELECTRICAL COMPONENTS

[76] Inventor: Christopher James Morrow, 5117 Middlebrook Rd., Virginia Beach, Va. 23464

[21] Appl. No.: 09/123,801

[22] Filed: Jul. 28, 1998

[51] Int. Cl.[6] ........................... A47B 96/06; A47G 29/00; A47R 1/00; E04G 3/00; E04G 5/06
[52] U.S. Cl. ........................................ 248/222.52; 211/26
[58] Field of Search ......................... 248/222.52, 222.11, 248/220.21, 220.31, 220.41, 224.8; 211/26, 189; 361/683, 390

[56] References Cited

U.S. PATENT DOCUMENTS

| | | |
|---|---|---|
| 3,685,708 | 8/1972 | Herrington . |
| 4,132,295 | 1/1979 | Hochfelsen . |
| 4,790,417 | 12/1988 | Tomikawa et al. . |
| 4,840,258 | 6/1989 | Tomikawa et al. . |
| 4,901,853 | 2/1990 | Maryatt . |
| 5,004,105 | 4/1991 | Freadman . |
| 5,199,772 | 4/1993 | Jordan . |
| 5,203,454 | 4/1993 | Strong et al. . |
| 5,269,306 | 12/1993 | Roesner ............................. 248/222.52 |
| 5,567,055 | 10/1996 | Smith . |

*Primary Examiner*—Ramon O. Ramirez

[57] ABSTRACT

An apparatus for releasably retaining electrical components has been invented. The apparatus has a support for assisting in bearing a cantilevered electrical component from a mounting plate of the electrical component. The support has a flange for receiving a load caused by the electrical component. The flange has an inner side, an outer side, at least one slot that communicates from the inner side of the flange to the outer side of the flange, and a plurality of nubs protruding from the inner side of the flange in proximity to each slot for retaining a key in an interference-fashion. The support can also have a leg attached to the flange for receiving the load from the flange and transferring the load to a case or some other ground. The leg can have a plurality of holes for receiving a screw for attaching the support to a case. The apparatus can include a key for passing through a mounting plate of an electrical component, past the outer side of the flange, and through the slot of the flange. The key can be for releasably engaging the nubs of the flange in an interference-fashion. The apparatus can also include a plurality of marks disposed on the leg for indicating regular intervals along the support, and a spacer with thickness for accommodating keys that are otherwise too long to cause an interference fit between: a key, the mounting plate of an electrical component, and the flange.

20 Claims, 3 Drawing Sheets

ASSEMBLY FOR RETAINING ELECTRICAL COMPONENTS

BACKGROUND

The present invention is a system for releasably retaining electrical components, such as those used by musicians for conditioning and amplifying sound generated in musical performances. The invention is an apparatus that utilizes a set of supports that cooperates with a number of keys to retain electrical components securely, while allowing the components to be readily removed from the supports. The invention allows the retention and removal of the electrical components from the supports without the use of tools.

Historically, rack rail has been relegated to an important but mundane role in the music industry. Typically, electrical components, such as those used in the music industry for conditioning and amplifying sound, are stored, and even transported, in hard-sided cases. These components often have standard widths, but vary in height to allow the components to be stacked in the aforementioned cases. In order to prevent the electrical components from moving during use and/or transportation, the devices are retained within the cases by use of rack rail.

Rack rails are lengths of "L"-shaped steel members which are attached to interior vertical sides of electrical component transportation cases, near the openings of said cases. One leg of the "L"-shape of the rack rail is typically placed parallel with, and is attached to, the interior wall of the case. The other leg of the rack rail protrudes perpendicularly from the wall of the case and has a series of vertically oriented, regularly-spaced, tapped holes.

In use, an electrical component is held in the case with its faceplate (ie., mounting plate) touching the rack rail. A screw is then placed through the faceplate of the electrical component and threaded into the rack rail. In this manner, the tightened screw secures the electrical component to the rack rail. This is typically repeated so that at least two screws on each side of the component engage the rack rail. The electrical components are, thereby, cantilevered within the interior of the case.

Several limitations are inherent in traditionally-styled rack rail. Screws are almost universally used to attach electrical components to rack rail. Consequently, the insertion, adjusting and removal of electrical equipment can be accomplished only by use of a tool. Also, rack rail and its attendant screws are made of metal, such as steel, which can easily scratch the surface finish of electrical equipment. Furthermore, the metal used in rack rail, as well as the metallic fasteners used in conjunction with rack rail, can cause unwanted electrical signal transmission or conduction from component-to-component or from component-to-ground, thereby hampering signal integrity within the electrical components. In addition, the tapped hole-and-screw fastening combination commonly employed with rack rail can be easily stripped. Once the tapped holes in a piece of rack rail are stripped, they are very difficult to repair. Also, the tapped holes in rack rail are inherently round. This limits the horizontal orientation or "play" that is sometimes necessary in fitting electrical components of slightly diverse widths within cases.

Consequently, a need exists for new apparatus that allows electrical components to be readily inserted, retained and removed from travel cases. There is a need for this insertion, retention and removal to occur without the use of tools. Furthermore, there is a need for such a device to be an insulator and not conduct electricity. Also, there is need for such a device that is not prone to scratching the surface finish of electrical components. Furthermore, there is a need for such a device that is resilient and that cannot readily be rendered inoperable, as screws are susceptible to stripping. Also, there is a need that the foregoing be accomplished in a manner that allows some margin of play in order to accommodate electrical components of slightly varying widths.

SUMMARY

An apparatus for releasably retaining electrical components has been invented. The apparatus has a support for bearing a cantilevered electrical component from a mounting plate of the electrical component. The support has an inner side, an outer side, at least one slot communicating from the inner side of the support to the outer side of the support (the slot for receiving a key), and a plurality of nubs protruding from the inner side of the support in proximity to each slot for retaining a key in an interference-fashion. The apparatus also has a key for passing through a mounting plate of an electrical component, past the outer side of the support, and through the slot of the support. The key is for releasably engaging the nubs of the support in an interference-fashion.

The apparatus can be attachable to mechanical ground, such as a wall, case or cabinet. The support can form a plurality of holes for receiving a screw. The apparatus can include a screw for attaching the support to mechanical ground by passing the screw through one of the holes. The apparatus can also include some other means for attaching the support to mechanical ground. The support can have a leg in which the holes are formed. The apparatus can also have a plurality of "marks" disposed on the leg for indicating regular intervals along the support. The marks can be raised from the leg and spaced in regular relation with the holes for providing visual and tactile reference regarding both the dimension of the support and the locations of the holes. The marks can be weakened areas on the leg and the marks can be spaced in regular relation with the holes for readily allowing separation of the support without tools.

The support can have a flange in which the slots are formed. The inner side of the support can form the inner side of the flange. The outer side of the support can form the outer side of the flange. The nubs can be integrated with the inner side of the flange.

The support can have a vertical length; the slots can have a horizontal dimension and a vertical dimension. The horizontal dimension of the slots can be greater than the vertical dimension of the slots. At least two nubs can be integrated in horizontal relation to each other on the inner side of the flange vertically above each slot; and at least two lower nubs can be integrated in horizontal relation to each other on the inner side of the flange vertically below each slot.

The key can have a grip for manipulation by a user, a shaft for transmitting forces imposed on the grip, and fingers attached to the shaft for engaging with the nubs. The apparatus can also have a spacer that has an opening for receiving and retaining the key. The spacer can also have a thickness for accommodating a key that is otherwise too long to cause an interference fit between a key, the mounting plate of an electrical component, and the support. The key can be an insulator. The support can be an insulator.

Stated in another way, an apparatus has been invented. The apparatus has a means for supporting that can be a cantilevered electrical component from a mounting plate of the electrical component. The supporting means has an inner side, an outer side, at least one slot communicating from the inner side of the supporting means to the outer side of the supporting means for receiving a retaining means, and a plurality of nubs protruding from the inner side of the supporting means in proximity to each slot for retaining a retaining means, interference-fashion. Also, the apparatus has a means for retaining that can pass through a mounting plate of an electrical component, past the outer side of the supporting means, and through the slot of the supporting means, the retaining means for releasably engaging the nubs of the supporting means in an interference-fashion.

Stated in another manner, an apparatus for releasably retaining electrical components has been invented. The apparatus has a support for assisting in bearing a cantilevered electrical component from a mounting plate of the electrical component. The support has a flange for receiving a load caused by the electrical component. The flange has an inner side, an outer side, at least one slot that communicates from the inner side of the flange to the outer side of the flange, and a plurality of nubs protruding from the inner side of the flange in proximity to each slot for retaining a key in an interference-fashion. The support can also have a leg attached to the flange for receiving the load from the flange and transferring the load to a case or some other ground. The leg can have a plurality of holes for receiving a screw for attaching the support to a case. The apparatus can include a key for passing through a mounting plate of an electrical component, past the outer side of the flange, and through the slot of the flange. The key can be for releasably engaging the nubs of the flange in an interference-fashion. The apparatus can also include a plurality of marks disposed on the leg for indicating regular intervals along the support, and a spacer with thickness for accommodating keys that are otherwise too long to cause an interference fit between: a key, the mounting plate of an electrical component, and the flange.

DRAWINGS

A preferred embodiment of the present invention will be described in greater detail with reference to the accompanying drawings, wherein like elements bear like reference numerals and where:

DESCRIPTION

Figure 1:
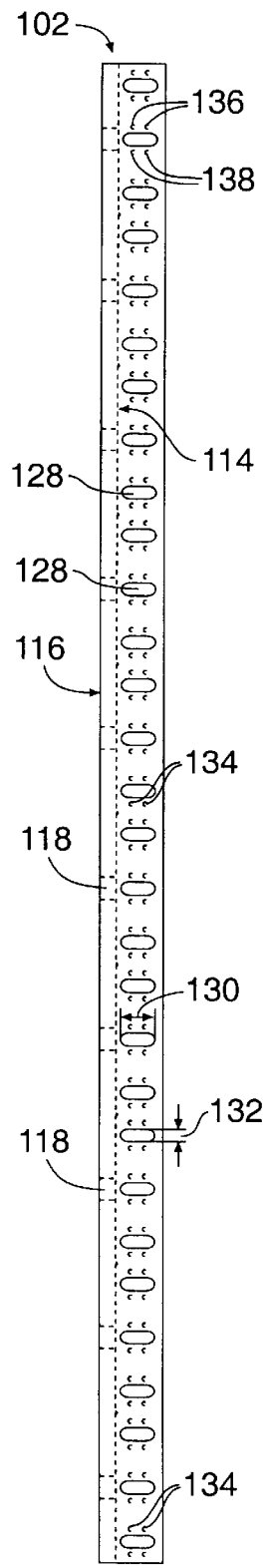
FIG. 1 is a front elevation view of the present invention.
Figure 2:
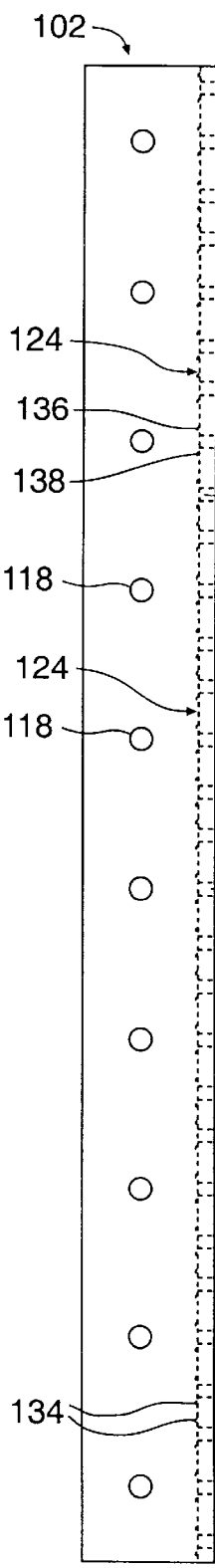
FIG. 2 is a left side elevation view of the present invention.

With reference next to the drawings, FIGS. 1–5 show the basic structure of a support 102 of the present invention. The support 102 has a leg 112 and a flange 122. The flange 122 is attached to the leg 112 at an angular orientation. The leg 112 and the flange 122 can be joined along their lengths to form an "L"-shaped bracket. The leg 112 has a front 114 and a back 116, the front 114 and the back 116 of the leg 112 being approximately parallel to each other. The leg 112 forms a plurality of holes 118 that communicate between the front 114 and the back 116 of the leg 112. The holes 118 of the leg 112 can assist in attaching the support 102 to a relative mechanical "ground" such as a wall, a cabinet or a case. The leg 112 can be attached to ground through the use of mechanical fasteners such as screws placed through the holes 118 or, alternatively, by a fastener attached to the back 116 of the leg 112, such as hook-and-loop fastener or adhesive.

Since the support 102 will bear the weight of heavy mechanical components in a cantilevered fashion, the holes 118 of the leg 112 can be frequently and regularly spaced so as to provide adequate transfer of load to ground. For example, the holes 118 of the leg 112 can be spaced closer together for heavy applications or farther apart for lighter-duty installations. If the holes 118 are generally close together and regularly spaced, then standardized, long lengths of the support 102 can be manufactured and distributed commercially, thereby allowing the realization of economies of scale. Then, at the time of purchase, an incremental length of support 102 can be cut according to the needs and desires of particular consumers without omitting an important hole 118. Customization of length of support 102 is important to consumers because mounting of electrical components is rarely done in any standardized dimension other than width of component.

Marks 120 can be regularly interspersed between the holes 118 on the front 114 (as shown) of the leg 112, the back 116 of the leg 112, or along the flange 122. The marks 120 can be used to assist in separating the support 102 into lengths desired by consumers. For example, the holes 118 can be centered at intervals of one and three-quarter inches (1¾ in.) and the marks 120 can be placed equidistantly between the holes 118. (This dimension is merely illustrative, as both smaller and larger dimensions could be similarly adequate in a particular application depending on the mass of the component and forces applied to the support 102.) Regular spacing of holes 118 and marks 120 allows consumers to readily measure and separate portions of the support 102 along a mark 120. Consumers can thereby purchase only that portion of the support 102 that they need or desire with the assurance that they will receive at least one hole 118 to assist in mounting the support 102 to ground.

Marks 120 can be merely cosmetic, providing a visual reference. However, marks 120 can also be regularly-spaced, raised portions on the leg 112 that allow purchasers to gauge incremental distances of the support 102 at the time of purchase by touch and also allow users of the apparatus to readily determine hole 118 position by hand when installing the support 102, as supports 102 are often installed in hard-to-reach locations or in poor light. Marks 120 can also be slight indentations, perforations, or weak spots otherwise formed in the support 102 that assist users in separating custom lengths of the support 102 without the use of tools.

The flange 122 of the support 102 is designed to receive the load of the cantilevered electrical component and transmit the load to the leg 112. The flange 122 has an inner side 124 and an outer side 126. The inner side 124 and the outer side 126 of the flange 122 are approximately parallel. A plurality of regularly-spaced slots 128 are formed in the flange 122. The slots 128 communicate between the inner side 124 of the flange 122 and the outer side 126 of the flange 122. The slots 128 have a horizontal dimension 130 and a vertical dimension 132. The horizontal dimension 130 of the slots 128 of the flange 122 is oriented in a direction perpendicular to the length of the support 102. The vertical dimension 132 of the slots 128 of the flange 122 is oriented in a direction parallel to the length of the support 102.

The horizontal dimension 130 of the slots 128 can be larger than the vertical dimension 132 of the slots 128. Such a relative size relationship between the horizontal dimension 130 and the vertical dimension 132 contributes to the functionality of the apparatus by allowing a specially designed key 142 to pass through the slot 128 and thereby readily retain electrical components. Also, the relative size relationship between the horizontal dimension 130 and the vertical dimension 132 allows for some "play" in the positioning and installation of electrical components to accommodate components of slightly different widths.

The slots 128 can be regularly spaced along the length of the support 102 for many of the same reasons as the holes 118 are regularly spaced in the leg 112. Additionally, however, electrical components, particularly those electrical components that are used to condition and amplify sound generated during musical performances, have mounting holes 162 in their faceplates 164 that are typically separated by standard vertical distances. For example, in North America, the standard vertical distances between mounting holes 162 are measured in increments of five-eighths of an inch (⅝ in.). Therefore, the vertical distance between the center of successive slots 128 on the flange 122 can be five-eighths of an inch (⅝ in.) or some other standard distance.

Figure 3:
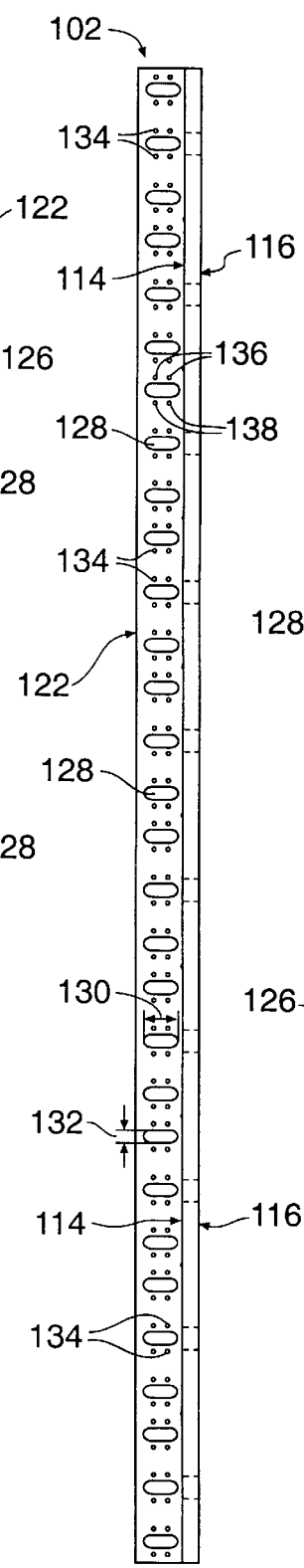
FIG. 3 is a rear elevation view of the present invention.
Figure 4:
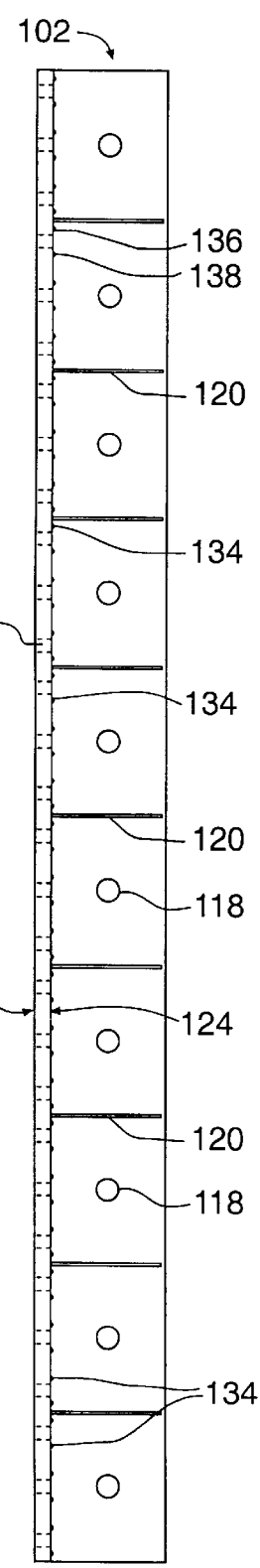
FIG. 4 is a right side elevation view of the present invention.
Figure 5:
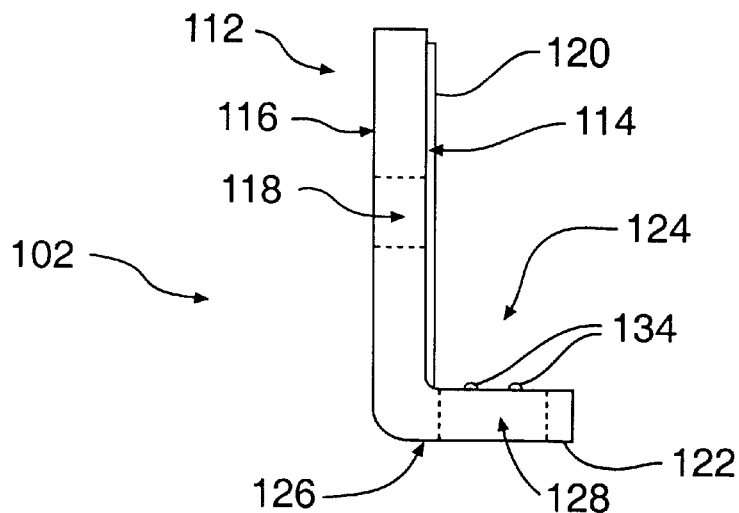
FIG. 5 is a top plan view of the present invention, the opposite side being a mirror image thereof.

As best shown in FIGS. 3 and 4, the inner side 124 of the flange 122 has a plurality of nubs 134 proximate each slot 128. For example, two upper nubs 136 can be placed in horizontal relation to each other on the inner side 124 of the flange 122 at a location above each slot 128. Additionally, two lower nubs 138 can be placed in horizontal relation to each other on the inner side 124 of the flange 122 at a location below each slot 128. The nubs 134 are for quickly and easily releasably retaining a specially designed key 142 in a slot 128.

Figure 9:
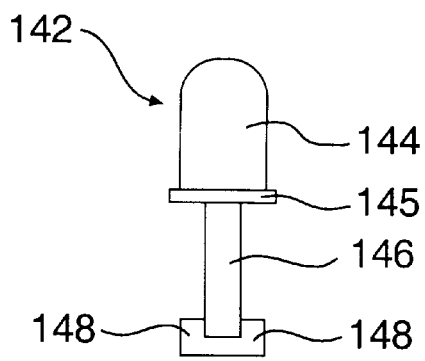
FIG. 9 is a front elevation view of a key of the present invention.
Figure 10:
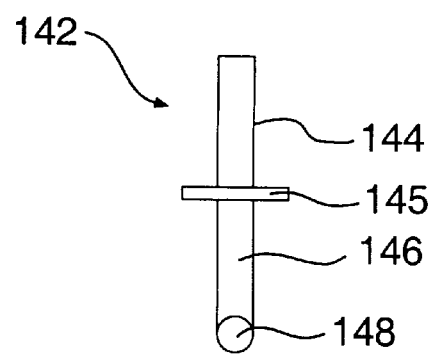
FIG. 10 is a side elevation view of a key of the present invention.

As show in FIGS. 9 and 10, the key 142 has a grip 144 with shoulders 145 for allowing a user to hold and manipulate the key 142. A shaft 146 is attached to the grip 148. The shaft 146 is for transmitting rotating forces that a user applies to the grip 148. Different keys 142 can be provided with shafts 146 of different lengths in order to accommodate faceplates 164 of different thicknesses. A pair of fingers 148 is radially attached to the shaft 146 so as to be capable of being rotated by the shaft 146 when the grip 144 is twisted by a user. The fingers 148 are oppositely oriented from each other.

Figure 6:
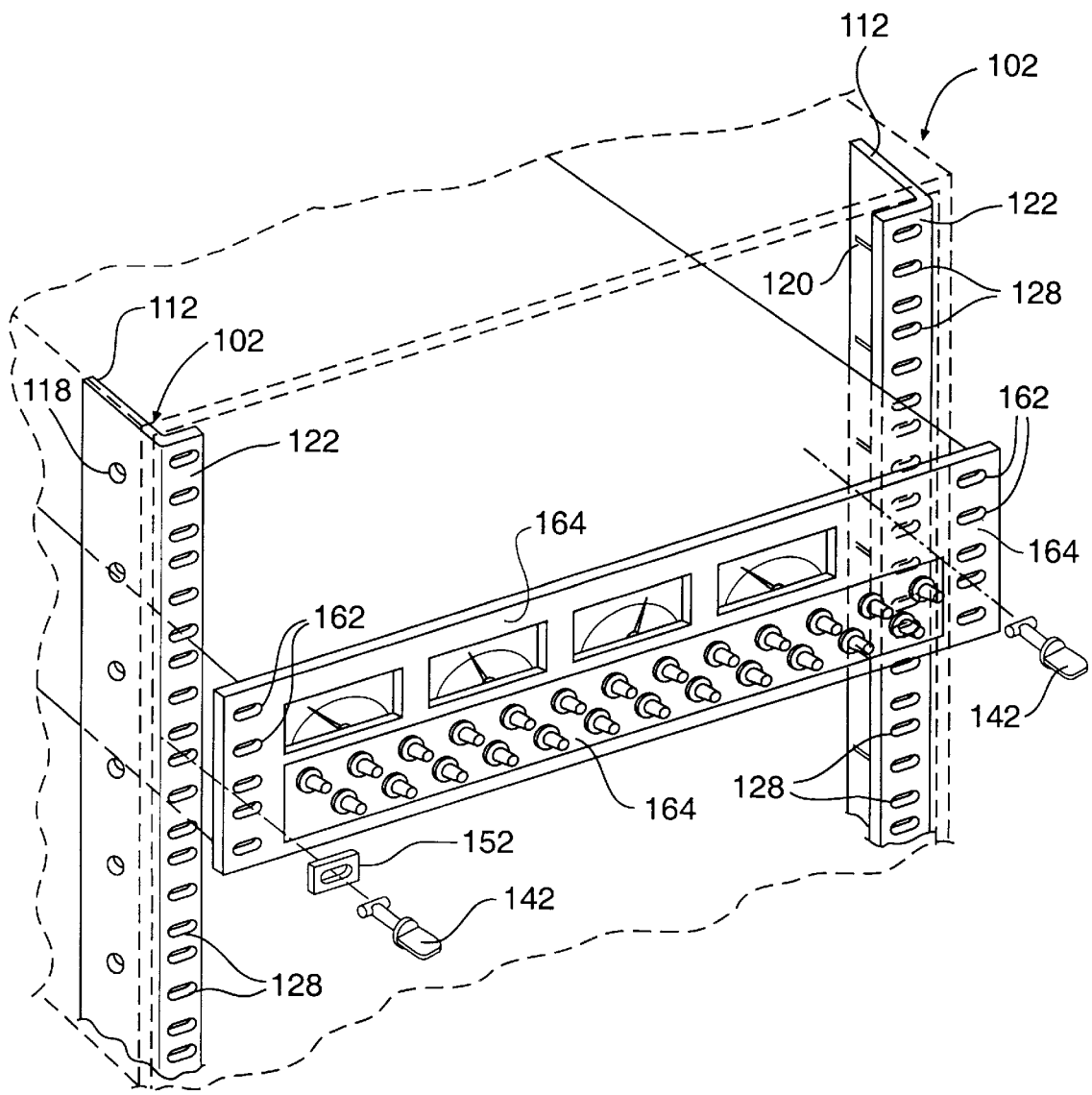
FIG. 6 is an exploded view of the present invention in use.

As shown in FIG. 6 and FIG. 3, in use, the opposed fingers 148 of the key 142 are passed through the mounting hole 162 of a faceplate 164 of an electrical component. Then the fingers 148 of the key 142 are passed from the outer side 126 of the flange 122 through a slot 128 until the fingers pass the inner side 124 of the flange 122. The grip 144 of the key 142 is then rotated so that the fingers 148 pass over one of the two upper nubs 136 and one of the two lower nubs 138 while, at the same time, the shoulders 145 of the grip 144 rotate from an orientation that is parallel with the horizontal dimension 130 of the slot 128 to an orientation that is parallel with the vertical dimension 132 of the slot, thereby causing the shoulders 145 to contact the faceplate 164 of the electrical component to thereby impede the further progress of the key 142 through the slot 128. The fingers 148 of the key 142 are then held, interference fashion, by the nubs 134.

An electrical component can be held in this manner by its weight being borne by its faceplate 164, with the faceplate 164 transferring the load to the key 142 and the flange 122. The flange 122 can transfer its load to the leg 112. The leg 112 can transfer its load to ground. One or more keys 142 can be used on either side of an electrical component to cantilever an electrical component between, for example, two supports 102.

Figure 7:
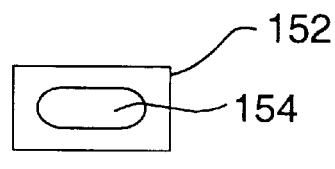
FIG. 7 is a front elevation view of a spacer of the present invention.
Figure 8:
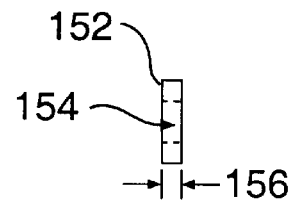
FIG. 8 is a side elevation view of a spacer of the present invention.

In addition to providing keys 142 with shafts 146 of different lengths in order to accommodate faceplates 164 of different thicknesses (in order to provide the above-described interference fit between: (a) the shoulder 145 of the key 142 and the faceplate 164 as well as the fingers 148 of the key 142, and (b) the nubs 134 of the inner side 124 of the flange 122), the apparatus can have one or more spacers 152 as shown in FIGS. 6–8. The spacer 152 forms an opening 154 to receive the fingers 148 of the key 142 and to retain the shoulders 145 of the key 142. The spacer 152 also has thickness 156. The thickness 156 of the spacer 152 accommodates shaft 146 lengths that are too long to cause an interference fit between a key 142, the faceplate 164 of an electrical component, and the flange 122.

In use, the fingers 148 of the key 142 are inserted through the opening 154 in the spacer 152; the fingers 148 are then inserted through the mounting hole 162 of the faceplate 164 of an electrical component. The fingers 148 then pass the outer side 126 of the flange 122 and into a slot 128 of the flange 122. The fingers 148 then pass the inner side 124 of the flange 122. The grip 144 of the key 142 is then rotated, causing the shoulders 145 of the key 142 to move from an orientation parallel with the horizontal dimension 130 of the slot 128 to an orientation that is parallel with the vertical dimension 132 of the slot 128. At the same time (because the grip 144 is attached to the fingers 148 by the shaft 146), the fingers 148 of the key 142 are rotated so as to pass over one of the two upper nubs 136 and one of the two lower nubs 138. One or more spacers 152 can be used together in this manner to provide for the interference fit between: (a) the shoulder 145 of the key 142 and the faceplate 164, and (b) the fingers 148 of the key 142 and the nubs 134 of the inner side 124 of the flange 122. Of course, the terms "vertical" and "horizontal" merely describe an arbitrary, relative frame of reference.

Electrical insulation is very important for the proper functioning of electrical components. If the support 102 and the keys 142 of the invention described herein are made of an insulator, such as substantially rigid polymetric material or a non-conducting coating, then the apparatus will have the added benefit of not conducting unwanted electrical noise. Even if the support 102 is conducting, the insulated keys 142 will reduce the likelihood of transmission of electrical noise, particularly if insulating pads are placed on the faceplates 164 to prevent direct electrical contact between the faceplate 164 and the flange 122.

Therefore, it has been demonstrated that an apparatus has been invented that allows electrical components to be readily inserted, retained and removed from mounting areas such as walls, cabinets and cases, especially when access to a faceplate, rather than the side of a components is all that is available. The apparatus can be used without tools. Furthermore, the device can be insulative and thereby reduce the transmission of unwanted electrical (including radio frequency) noise. The device can be fabricated so as not to be prone to scratching the surface finish of electrical components. Furthermore, the device is resilient and cannot readily be rendered inoperable, as screws are susceptible to stripping. Also, the foregoing is accomplished in a manner that allows some margin of play to accommodate electrical components of slightly varying widths. However, it should be understood that the described embodiments merely illustrate principles of the invention. Many modifications, additions and deletions may be made without departure from the description provided. For example, "nubs" can be raised portions as described herein, but they can also be grooves on the inner side 124 of the flange 122 that receive and retain fingers 148 of the keys 142.

What is claimed is:

1. An apparatus for releasably retaining electrical components, the apparatus comprising:
    a support, the support for bearing a cantilevered electrical component from a mounting plate of the electrical component, the support comprising:
    an inner side,
    an outer side,
    at least one slot, the slot communicating from the inner side of the support to the outer side of the support, the slot for receiving a key, and
    a plurality of nubs protruding from the inner side of the support in proximity to each slot, the nubs for retaining a key in an interference-fashion; and
    the apparatus further comprising a key for passing through a mounting plate of an electrical component, past the outer side of the support, and through the slot of the support; the key for releasably engaging the nubs of the support in an interference-fashion.

2. The apparatus of claim 1 wherein the support is attachable to mechanical ground.

3. The apparatus of claim 2 wherein the mechanical ground is a wall.

4. The apparatus of claim 2 wherein the mechanical ground is a case.

5. The apparatus of claim 2 wherein the mechanical ground is a cabinet.

6. The apparatus of claim 2 wherein the support forms a plurality of holes for receiving a screw, the apparatus further comprising a screw for attaching the support to mechanical ground, the screw for passing through one of the holes.

7. The apparatus of claim 6 wherein the support has a leg in which the holes are formed.

8. The apparatus of claim 7 further comprising a plurality of marks disposed on the leg, the marks for indicating regular intervals along the support.

9. The apparatus of claim 8 wherein the marks are weakened areas on the leg, the marks being spaced in regular relation with the holes, the marks for readily allowing separation of the support without tools.

10. The apparatus of claim 8 wherein the marks are raised from the leg, the marks being spaced in regular relation with the holes, the marks for providing visual and tactile reference regarding both the dimension of the support and the locations of the holes.

11. The apparatus of claim 2 further comprising a means for attaching the support to mechanical ground.

12. The apparatus of claim 2 wherein the support has a flange in which the slots are formed, and wherein the inner side of the support forms the inner side of the flange and the outer side of the support forms the outer side of the flange.

13. The apparatus of claim 12 wherein the nubs are integrated with the inner side of the flange.

14. The apparatus of claim 13 wherein:
    the support has a vertical length;
    the slots have a horizontal dimension and a vertical dimension, the horizontal dimension of the slots being greater than the vertical dimension of the slots;
    at least two nubs are integrated in horizontal relation to each other on the inner side of the flange, vertically above each slot; and
    at least two lower nubs are integrated in horizontal relation to each other on the inner side of the flange, vertically below each slot.

15. The apparatus of claim 1 wherein the key comprises:
    a grip, the grip for manipulation by a user;
    a shaft for transmitting forces imposed on the grip;
    and fingers attached to the shaft, the fingers for engaging with the nubs.

16. The apparatus of claim 1 further comprising a spacer, the spacer forming an opening for receiving and retaining the key, the spacer further comprising a thickness, the thickness of the spacer for accommodating a key that is otherwise too long to cause an interference fit between a key, the mounting plate of an electrical component, and the support.

17. The apparatus of claim 1 wherein the key is an insulator.

18. The apparatus of claim 1 wherein the support is an insulator.

19. An apparatus for releasably retaining electrical components, the apparatus comprising:
    a means for supporting, the supporting means for bearing a cantilevered electrical component from a mounting plate of the electrical component, the supporting means comprising:
    an inner side,
    an outer side,
    at least one slot, the slot communicating from the inner side of the supporting means to the outer side of the supporting means, the slot for receiving a retaining means, and
    a plurality of nubs protruding from the inner side of the supporting means in proximity to each slot, the nubs for retaining a retaining means, interference-fashion; and
    a means for retaining for passing through a mounting plate of an electrical component, past the outer side of the supporting means, and through the slot of the supporting means; the retaining means for releasably engaging the nubs of the supporting means in an interference-fashion.

20. An apparatus for releasably retaining electrical components, the apparatus comprising:
    a support, the support for assisting in bearing a cantilevered electrical component from a mounting plate of the electrical component, the support comprising:
    a flange for receiving a load caused by the electrical component, the flange comprising:
    an inner side,
    an outer side, at least one slot, the slot communicating from the inner side of the flange to the outer side of the flange, the slot for receiving a key, a plurality of nubs protruding from the inner side of the flange in proximity to each slot, the nubs for retaining a key in an interference-fashion, the support further comprising:

a leg, the leg attached to the flange, the leg for receiving the load from the flange and transferring the load to a case, the leg comprising a plurality of holes formed in the leg for receiving a screw, a screw for attaching the support to a case, the screw for passing through one of the holes of the leg, a key for passing through a mounting plate of an electrical component, past the outer side of the flange, and through the slot of the flange; the key for releasably engaging the nubs of the flange in an interference-fashion, a plurality of marks disposed on leg, the marks for indicating regular intervals along the support, a spacer, the spacer forming an opening for receiving and retaining the key in an interference-fashion between the mounting plate of an electrical component and the flange, the spacer further comprising a thickness, the thickness of the spacer for accommodating keys that are otherwise too long to cause an interference fit between: a key, the mounting plate of an electrical component, and the flange.

\* \* \* \* \*